United States Patent
Timmons

(10) Patent No.: US 6,612,379 B1
(45) Date of Patent: Sep. 2, 2003

(54) MULTI-PURPOSE GARDENING TOOL

(75) Inventor: William D. Timmons, Coshocton, OH (US)

(73) Assignee: Wilmart, Ltd., Coshocton, OH (US)

( * ) Notice: Subject to any disclaimer, the term of this patent is extended or adjusted under 35 U.S.C. 154(b) by 0 days.

(21) Appl. No.: 10/073,807

(22) Filed: Feb. 11, 2002

(51) Int. Cl.[7] .......................... A01B 1/00; B65B 67/12
(52) U.S. Cl. ..................... 172/375; 172/381; 294/55; D8/10; D8/98; D8/105; D8/107; D8/315
(58) Field of Search ................. 294/55; D8/1, D8/7, 10, 98, 105, 107, 300, 315, 316; 172/371, 375, 376, 377, 381

(56) References Cited

U.S. PATENT DOCUMENTS

| | | | |
|---|---|---|---|
| 171,252 A | | 12/1875 | Woodward |
| 182,747 A | * | 10/1876 | Button .......................... 294/55 |
| 203,885 A | * | 5/1878 | Button .......................... 294/55 |
| 440,059 A | * | 11/1890 | Quigley ........................ 294/55 |
| 457,271 A | | 8/1891 | Hall |
| 662,284 A | * | 11/1900 | Morrell ........................ 294/55 |
| 695,359 A | | 3/1902 | Wolfe |
| 722,965 A | * | 3/1903 | Flitsch et al. ................. 294/55 |
| 861,107 A | * | 7/1907 | Goggin ......................... 294/55 |
| 972,404 A | | 10/1910 | Pond |
| 976,970 A | * | 11/1910 | Wolary ......................... 294/55 |
| 1,201,076 A | * | 10/1916 | Murray ......................... 294/55 |
| 2,511,560 A | * | 6/1950 | Bechmann ................... 294/55 |
| 3,804,450 A | | 4/1974 | Guenzel ....................... 294/51 |
| 3,840,261 A | * | 10/1974 | Fulkerson et al. ............ 294/55 |
| 4,102,547 A | * | 7/1978 | Williams ................... 294/55 X |
| 4,126,346 A | * | 11/1978 | Burns ........................... 294/55 |
| 4,194,778 A | * | 3/1980 | Hodnett ..................... 294/55 X |
| D254,705 S | | 4/1980 | Whiteside ..................... D8/1 |
| 4,198,720 A | * | 4/1980 | Matsumoto ................... 294/55 |
| 4,515,223 A | | 5/1985 | Erickson ..................... 172/372 |
| 4,646,795 A | * | 3/1987 | Hebron et al. ................. 294/55 |
| 4,686,734 A | * | 8/1987 | Kahan .......................... 294/55 |
| D362,163 S | | 9/1995 | George ........................... D8/7 |
| 5,575,315 A | | 11/1996 | Wengert ...................... 141/109 |
| D387,514 S | | 12/1997 | Savicki ....................... D30/162 |
| 5,785,369 A | * | 7/1998 | Ridley, Sr. et al. ........... 294/55 |
| D406,020 S | | 2/1999 | Reed et al. ..................... D8/1 |
| 5,868,447 A | * | 2/1999 | Clark et al. ................ 294/55 X |
| 5,951,079 A | * | 9/1999 | Winskye ....................... 294/55 |
| 5,960,891 A | | 10/1999 | Sheehan et al. ............ 172/381 |
| 6,416,097 B1 | * | 7/2002 | O'Rourke .................... 294/55 |
| D463,723 S | * | 10/2002 | Sigueiros .................. 294/55 X |

OTHER PUBLICATIONS

Copies of front and back cover and p.8 of a catalog entitled "Florian Rachet–Cut® Pruning Tools", published by Florian Tools, Southington, CT 06489. p. 8 shows a product identified as a "Trake" (Part No. HF900105), which includes a trowel and rake tool. Publication date of catalog unknown. Applicant received catalog by mail in or about Mar. 2002.

* cited by examiner

*Primary Examiner*—Christopher J. Novosad
(74) *Attorney, Agent, or Firm*—Watts, Hoffmann, Fisher & Heinke, Co., L.P.A.

(57) ABSTRACT

The present invention is directed to a multi-purpose gardening tool. In one preferred embodiment, the tool includes an arcuate central base. Extending from one end of the base is an arcuate scoop adapted to dig into, scoop up and transport a quantity of material. Extending from an opposite end of the base is a substantially V-shaped cutter having a sharpened peripheral edge for cutting through roots and the like. Preferably, the base, scoop and cutter are aligned and have a common radius of curvature to define a smooth bottom surface. The tool includes a handle extending generally parallel to a longitudinal axis of the tool. To protect a hand of a gardener gripping the handle, the handle offset from the peripheral edges of the scoop and cutter and the handle is supported at opposite ends by a pair of solid circular supports.

21 Claims, 4 Drawing Sheets

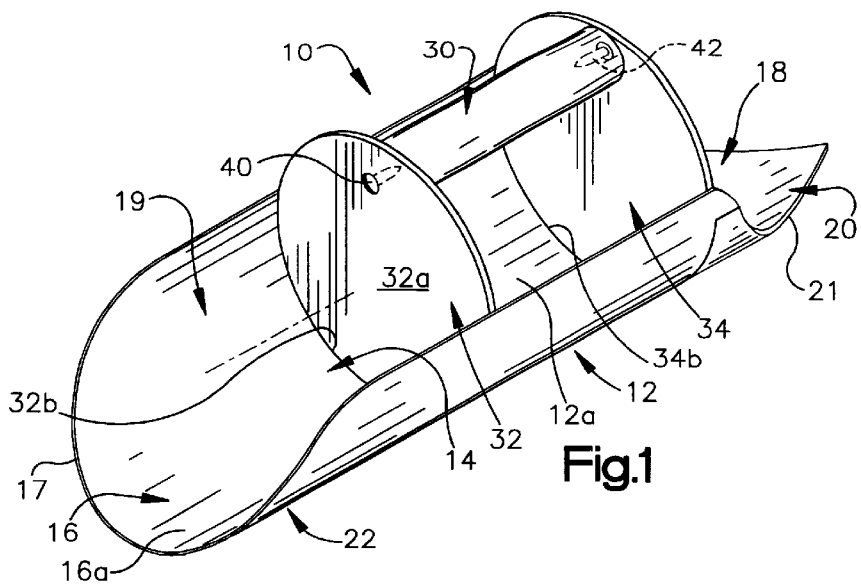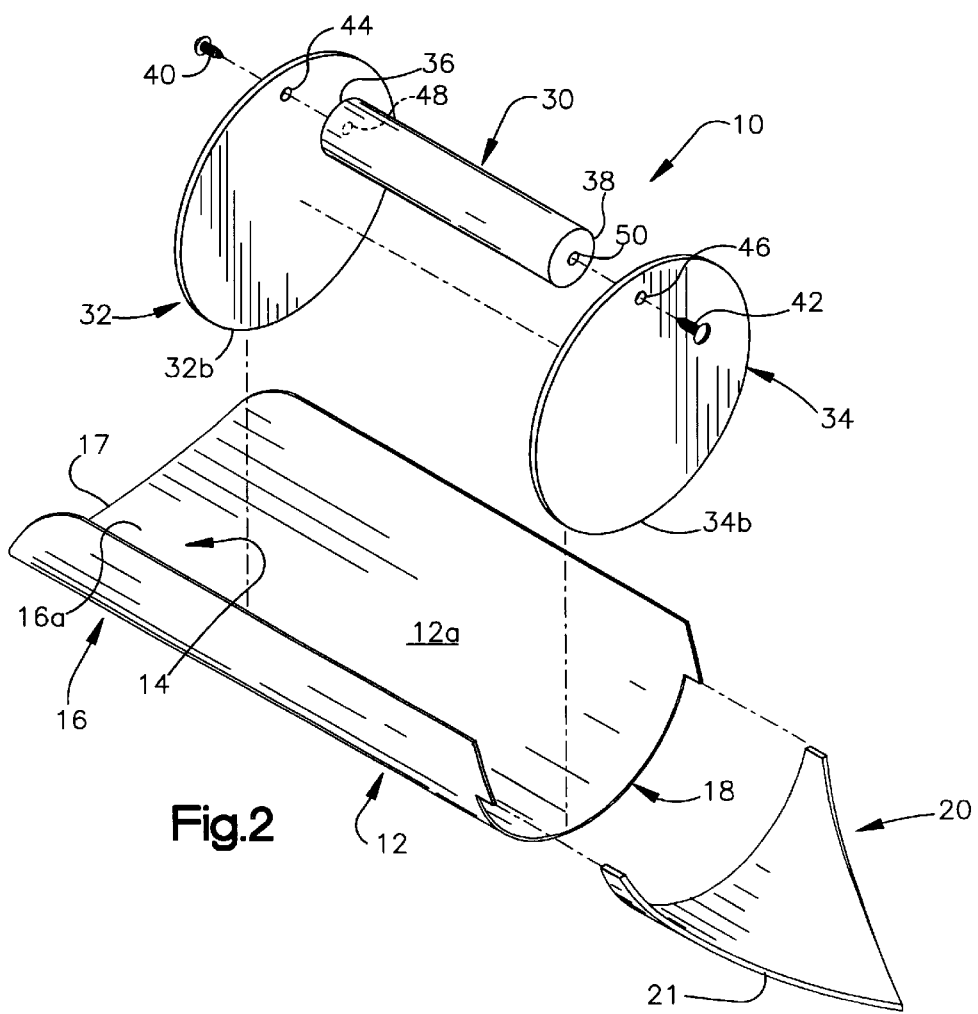

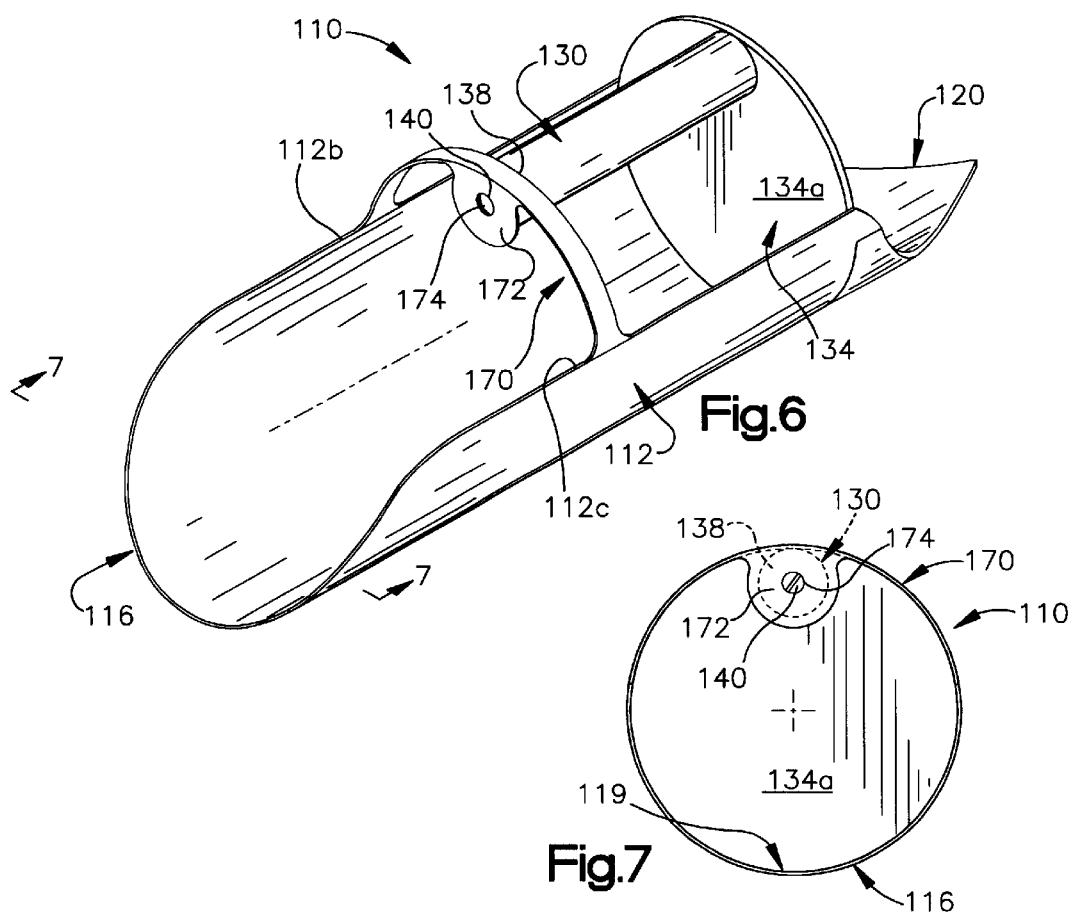
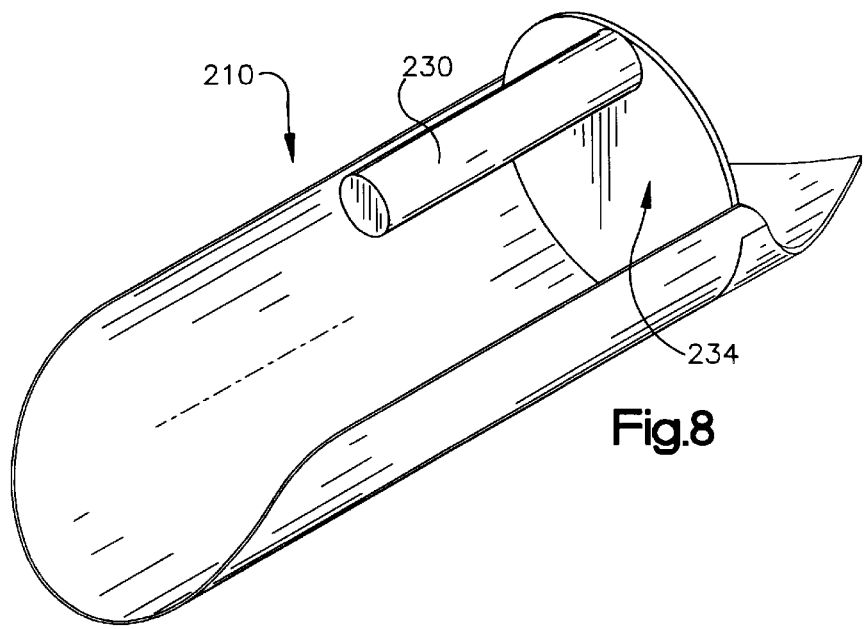

MULTI-PURPOSE GARDENING TOOL

FIELD OF THE INVENTION

The present invention is directed to a gardening tool and, more specifically, to a gardening tool having a scoop disposed at one end of the tool, a blade or cutter disposed at an opposite end and a handle disposed along a longitudinal axis of the gardening tool offset from the scoop and cutter.

BACKGROUND ART

Gardening requires digging and the movement of topsoil for the planting of seeds and seedlings and the planting or transplanting of plants. While long handle shovels are acceptable for moving large quantities of dirt and digging deep holes, hand held spades and scoops are normally used for digging shallow holes for planting smaller plants, seedlings and seeds. Often times during digging a hole for planting a plant or seeding or digging a row or furrow for planting seeds, a root of a tree or bush is encountered which obstructs the gardener from completing the hole or furrow in the desired location. Typically, a gardener may resort to use a long handle shovel or hoe to sever the obstructing root. However, this requires the gardener to put down the spade or scoop, stand up from a kneeling position, pick up the shovel or hoe, use the shovel or hoe while. standing to cut the root, and then kneel down to resume using the hand held spade or scoop.

What is needed is a multi-purpose gardening tool that permits a gardener to both dig a hole or furrow and cut a root, while maintaining a kneeling position. What is also needed is a multi-purpose gardening tool that permits both digging and cutting to be accomplished without changing the grip of the gardener on the gardening tool. What is further needed is a multi-purpose gardening tool that is designed to protect the gardener's gripping hand while using the gardening tool for as either digging or cutting.

SUMMARY OF THE INVENTION

The present invention features a multi-purpose gardening tool. In a first preferred embodiment of the multi-purpose gardening tool of the present invention, the tool includes a central base or body portion. Extending from one end of the base is an arcuate scoop adapted to dig into, scoop up and transport a quantity of topsoil, mulch or other material. Extending from an opposite end of the base is a substantially V-shaped cutter or blade having a sharpened peripheral edge for cutting through roots, small branches, thistles, vines, prying up smaller buried rocks or breaking up compacted soil. In one preferred embodiment, the base is comprised of an arcuate steel plate and the scoop, and cutter are welded to the base and all three components have a common radius of curvature for a smooth profile.

The tool includes a handle extending generally parallel to a longitudinal axis of the tool and offset from the scoop and cutter. The handle is supported by the base and, in one preferred embodiment is supported by a pair of spaced apart supports affixed to an upper surface of the base and extending upwardly from the base. The handle is affixed to the supports. In one preferred embodiment the supports comprise circular or disk shaped steel members welded to the upper surface of the base. The radius of the steel disk supports conform to the radius of curvature of the base. The handle extends between the steel disk supports and the handle is affixed to the steel disk supports with screws.

The handle is offset from the working edges of the scoop and cutter, that is, the handle is offset from a line of action through the working or peripheral edges of the scoop and cutter this helps protect the gardener's gripping hand from branches, roots, thistles and the like that may be sticking upwardly at an angle that would otherwise poke, cut or dig into the gardener's hand as the tool is being used. Further protection to the gardener's hand is afforded by the steel disk supports which extend from the base to the handle and function to deflect branches, roots, thistles and the like that would otherwise poke into the gardener's fingers as the tool is being used. Advantageously, with the garden tool of the present invention, the gardener may alternate between using the scoop for digging and using the cutter for cutting and chopping without changing his or her grip on the handle. This saves valuable time compared with using two separate hand-held tools, e.g., using a spade for digging and using a hatchet or hoe for cutting roots.

In an alternate preferred embodiment of the present invention, a single steel disk support may be used to support one end of the handle. The other end of the handle may be supported by an arcuate or U-shaped bracket. The bracket may comprise a flat, arcuate piece of metal, an arcuate rod or any appropriate structure that may be attached to the handle and upper edges of the base to provide support for the second end of the handle while the disk support is used to support the first end of the handle. Advantageously, the disk support would be positioned on the cutter side of the base such that the gardener's hand would be protected when using the cutter. Greater power and speed of the tool would generally be used when using the cutter than when using the scoop, e.g., a powerful swing of the gardener's arm may be needed to cut thick roots with the cutter. Therefore, it would be more important to provide additional protection to the gardener's hand afforded by the disk support when the cutter is being used. The use of a single disk support also results in a greater material carrying capacity of the scoop.

These and other objects, advantages and features of the invention will become better understood from a detailed description of an exemplary embodiment of the invention which is described in conjunction with the accompanying drawings.

BRIEF DESCRIPTION OF THE DRAWINGS

FIG. 1 is a perspective view of a first preferred embodiment of a multi-purpose gardening tool of the present invention;

FIG. 2 is an exploded perspective of the gardening tool of FIG. 1;

FIG. 6 is a perspective view of a second preferred embodiment of a multi-purpose gardening tool of the present invention;

FIG. 7 is a front elevation view of the gardening tool of FIG. 6 as seen from a plane indicated by the line 7—7 in FIG. 6; and FIG. 8 is a perspective view of a third preferred embodiment of a multi-purpose gardening tool of the present invention.

DETAILED DESCRIPTION OF THE PREFERRED EMBODIMENTS

First Preferred Embodiment of Gardening Tool

Figure 3:
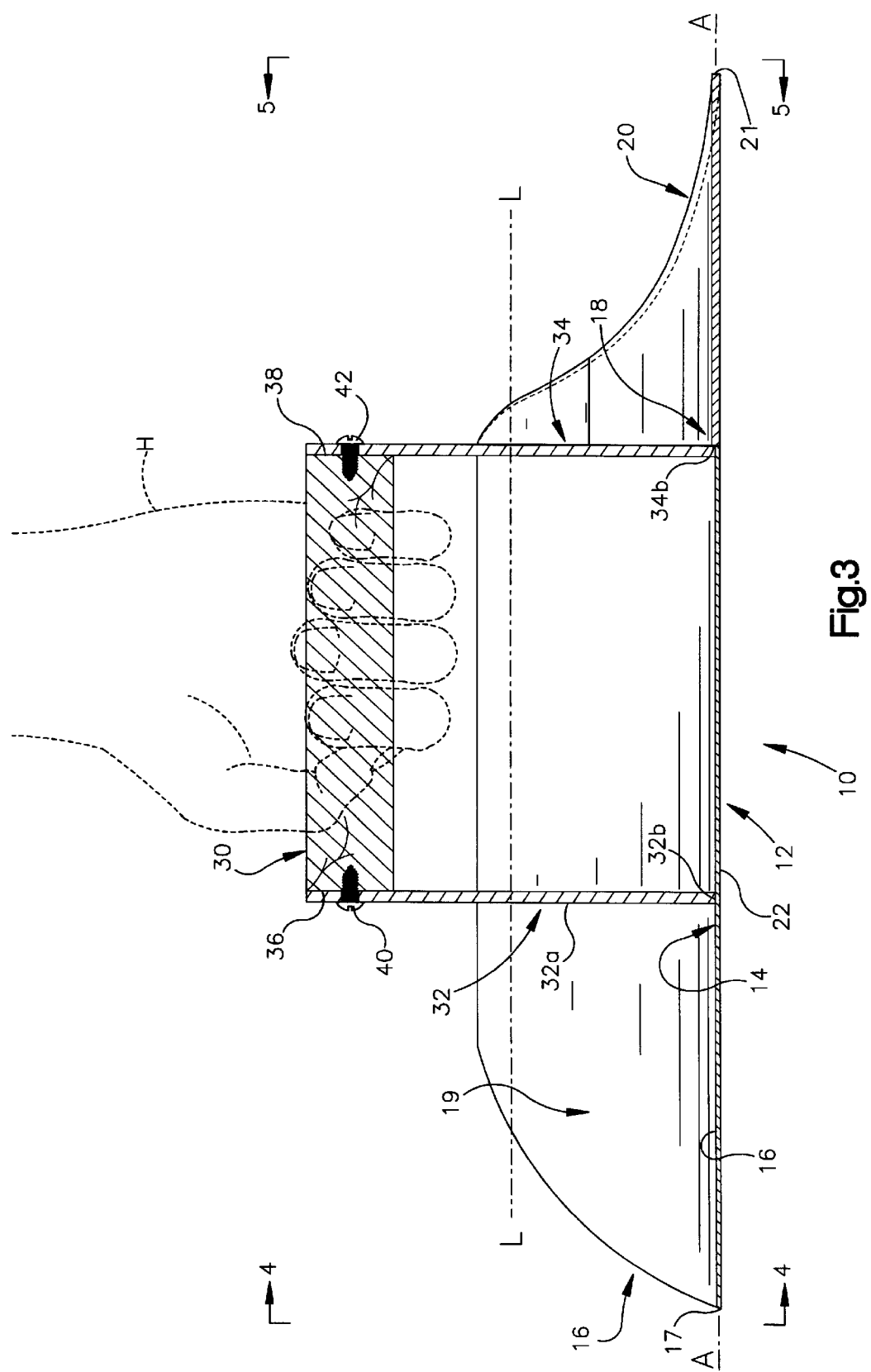
FIG. 3 is a side elevation view of the gardening tool of FIG. 1.

Turning to the drawings, FIGS. 1–5 show a first preferred embodiment of a multi-purpose gardening tool of the present invention generally at 10. The tool 10 includes an arcuate or curved body or base 12. The base 12 is preferably fabricated from 1/16" thick steel. In one embodiment of the tool 10, the base 12-may be fabricated of stainless steel. Alternately, the base 12 may be fabricated of a durable, high impact plastic material. In one preferred embodiment, an inner radius of curvature of the base 12 is approximately 2 inches (that is, if the base was extended laterally to form a complete circle, the inner diameter of the circle would be approximately 4 inches), the curvature of the base encompasses an arc exceeding 180 degrees and has a circumference of approximately 7¼ inches In one preferred embodiment, the overall longitudinal length of tool is approximately 12¾ inches.

Extending from a first end 14 the base 12 is a scoop 16 having a curved peripheral edge 17 adapted for digging dirt, topsoil, small stones and similar gardening materials. An upper surface 16a of the scoop 16 defines a material-holding region 19 extending away from the peripheral edge 17 and toward the base 12 for transporting of the material dug up by the peripheral edge 17. A radius of curvature of the scoop 16 is the same as the radius of curvature of the base 12. Preferably, the scoop 16 and base 12 are fabricated from a single piece of material, such as steel or stainless steel plate. Alternatively, the scoop 16 may be welded to the base 12. The scoop 16, like the base 12, is fabricated of 1/16 inch thick stainless steel and is strong enough to avoid bending the peripheral edge 18 of the scoop if a rock is hit while digging.

Extending from an opposite end 18 of the base 12 is a generally V-shaped cutter or blade 20 used for chopping roots, vines, thistles, breaking up compacted ground, or prying out small rocks from the ground. Unlike the scoop 16, preferably, the cutter 20 is fabricated from a thicker piece of material than the base 12 for added strength and durability when chopping. Preferably, the cutter 20 is comprised of a ⅛' thick stainless steel plate that is welded to the base 12.

It should be recognized that although it is preferable for the cutter 20 to be thicker than the base 12 for added strength, the tool 10 would certainly be functional if the base 12, scoop 16 and cutter 20 were fabricated from a single piece of material, such as a stainless steel plate of uniform thickness. In fact, such a tool utilizing uniform thickness plate would be lighter and easier to manufacture. Further, it should be recognized that while in the preferred embodiment, the cutter 20 is welded to the end 18 of the base 12, other fastening techniques such as mechanical fasteners may be used as would be recognized by those skilled in the art. The cutter 20 is generally V-shaped and includes a sharpened peripheral edge 21 that facilitates chopping and cutting tree roots, vines, and the like as well as prying rocks out of the ground.

Figure 4:
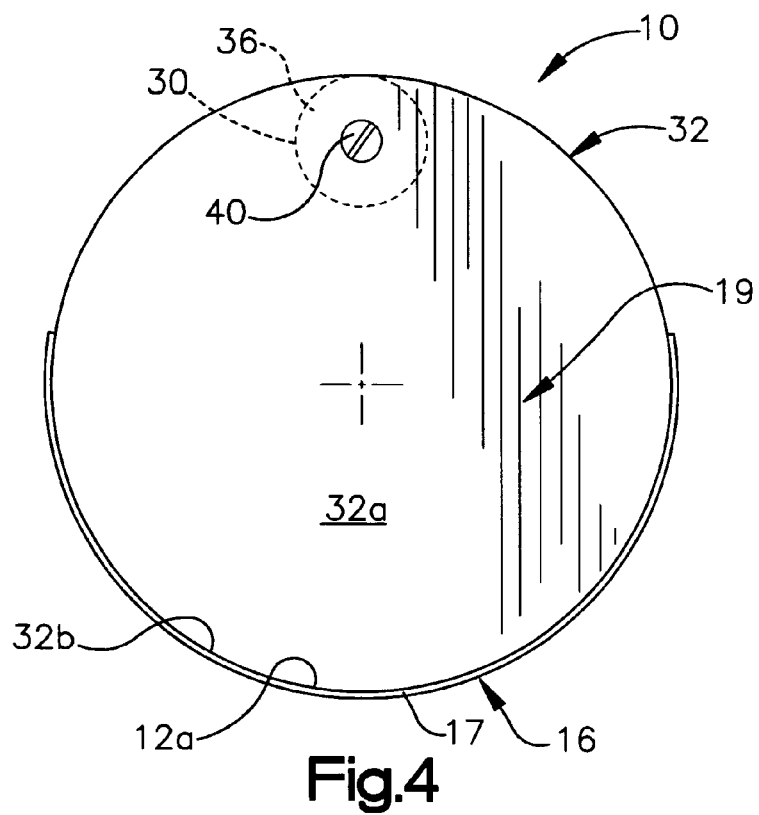
FIG. 4 is a front elevation view of the gardening tool of FIG. 1 as seen from a plane indicated by the line 4—4 in FIG. 3.
Figure 5:
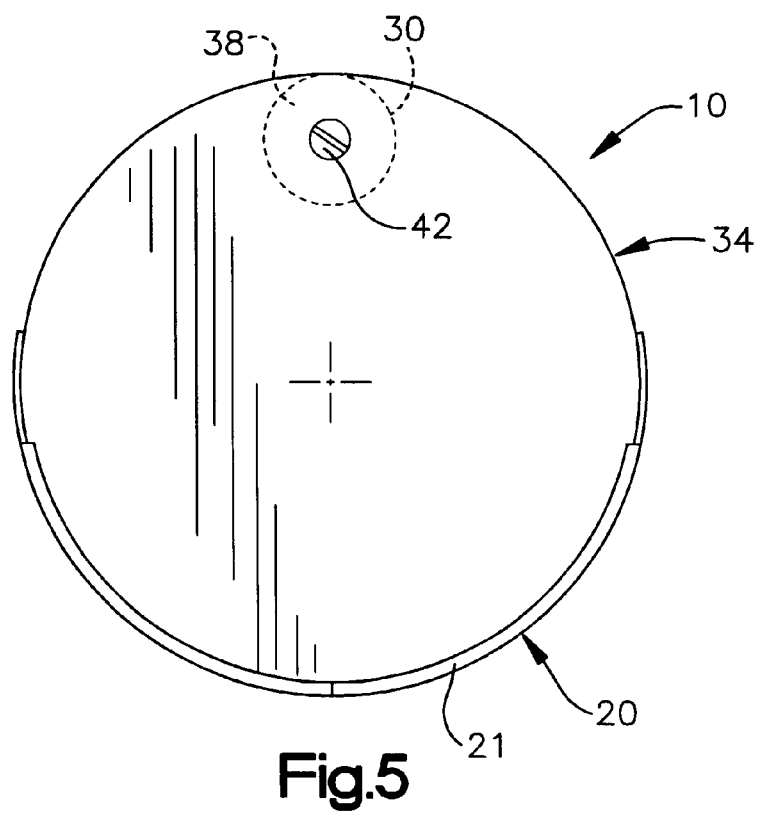
FIG. 5 is a rear elevation view of the gardening tool of FIG. 1 as seen from a plane indicated by the line 5—5 in FIG. 3.

As can best be seen in FIGS. 4 and 5, a radius of curvature of the scoop 16 and cutter 20 is congruent with the radius of curvature of the base 12 and the cutter 20 is aligned with the base 12 such that a bottom surface 22 of the tool 10 is smooth which facilitates digging with the scoop 16 as well as prying with the blade 20.

A central handle 30 extends along a portion of the longitudinal extent of the tool 10 and is parallel to a longitudinal axis L—L of the tool 10. The handle 30 may be made of wood, plastic, rubber, elastomer or any material suitable for gripping by a gardener's hand, shown as H in dashed line in FIG. 3. The handle 30 is supported by two supports 32, 34, which, in one preferred embodiment, comprise spaced apart circular steel members or disks. The supports 32, 34 are welded along a portion of their lower peripheries 32b, 34b to an upper surface 12a of the curved base 12. The supports 32, 34 extend from the upper surface 12a of the base 12 to the handle 30. In one preferred embodiment, the diameter of the supports 32, 34 is approximately 4 inches, conforming to the radius of curvature of the base 12, the longitudinal length of the handle is 4 inches and the diameter of the handle is 1 inch.

Opposite ends 36, 38 of handle 30 are affixed to the supports 32, 34 by two screws 40, 42 that extend through respective openings 44, 46 in the supports 32, 34 and thread into openings 48, 50 in the handle ends 36, 38. A side surface 32a of the disk support 32 bounds and limits the material holding region 19 of the scoop.

The handle 30 is offset from the peripheral edge 17 of the scoop 16 and the peripheral edge 21 of the cutter 20, that is, the handle 30 is offset from a line of action (shown as A—A in FIG. 3) of the tool 10 where the line of action is defined as a line extending between the peripheral edges 17, 21 of the scoop 16 and cutter 20. Because of the offset handle 30, the gardener's hand is out of harm's way with respect to roots, branches and the like that may be sticking in or up from the ground in the direction of the tool 10 as the tool is used by the gardener. Further, the gardener's fingers are further protected by the two steel disk supports 32, 34 that bound both ends of the handle 30. The fingers of the gardener's hand are protected when either the scoop 16 or cutter 20 is used.

Advantageously, the design of the tool 10 permits the gardener to alternate between using the scoop 16 for digging and using the cutter 20 for cutting and chopping without changing the grip or position of his or her hand H (FIG. 3) on the handle 30. The ability to use the tool 10 for digging and chopping without changing hand grip saves valuable time compared with using two separate hand-held tools, e.g., using a spade for digging and using a hatchet or hoe for cutting roots.

Second Preferred Embodiment of Gardening Tool

A second preferred embodiment of the multi-purpose gardening tool of the present invention is shown at 110 in FIGS. 6–7. As with the first embodiment, the tool 110 includes a base 112, a scoop 116, a cutter 120 and a handle 130. The second preferred embodiment of the tool 110 provides for an increased volume of material that can be dug and carried when the scoop 116 is used. The circular steel support 32 of the tool 10 of the first embodiment is replaced by a generally U-shaped bracket 170. The bracket 170 supports an end 138 of the handle 130. The bracket 170 is welded to opposite upper edges 112b, 112c of the base 112 and includes a central portion 172 which defines opening 174 for receiving a screw 140. The bracket. 170 extends from an upper surface 112a of the base 112 to the handle 130.

By replacing the steel disk support 32 of the first embodiment with the U-shaped bracket 170 in the second embodiment, the volume of material that can be carried by a material holding region 119 of the scoop 116 of the second embodiment is markedly increased compared to the material holding region 19 of the scoop 16 of the first embodiment. The use of bracket 170 extends the material holding region 119 to extend under the handle 130 along the base 112. A side surface 134a of the disk support 134 bounds and limits the material holding region 119.

Third Preferred Embodiment of Gardening Tool

A third preferred embodiment of the gardening tool is shown at 210 in FIG. 8. This embodiment is similar to the second embodiment with the bracket 170 being removed. In this third embodiment, the handle 230 is supported by a single disk support 234. This results in less support and stability for the handle 230 (because of eliminating one point of support for the handle 230), however, this disadvantage is compensated by reduced weight and lower manufacturing cost for the tool 210.

While the present invention has been described with a degree of particularity, it is the intent that the invention include all modifications and alterations from the disclosed embodiments falling within the spirit or scope of the appended claims.

I claim:

1. A gardening tool comprising:
  a) a base having a lower surface and an upper surface;
  b) a scoop extending from the base and defining a first end of the tool, the scoop including a curved portion having a peripheral edge for digging and a second portion extending between the curved portion and the base for transporting material;
  c) a cutter extending from the base and defining a second end of the tool, the cutter including a tapered portion having a sharpened peripheral edge for cutting;
  d) a handle extending in a direction parallel to a longitudinal axis of the tool and being offset in a direction transverse to the longitudinal axis of the tool from the upper surface of the base, an upper surface of the scoop and an upper surface of the cutter, an extent of the handle in the direction parallel to the longitudinal axis of the tool being offset from an extent of the curved portion of the scoop in the direction parallel to the longitudinal axis of the tool and being offset from an extent of the tapered portion of the cutter in the direction parallel to the longitudinal axis of the tool; and
  e) a first handle support affixed to one of the base, the scoop and the cutter and a the handle.

2. The gardening tool of claim 1 wherein the base, scoop and cutter are arcuate in a direction orthogonal to the longitudinal axis of the tool.

3. The gardening tool of claim 2 wherein the base, scoop and cutter have a common radius of curvature.

4. The gardening tool of claim 3 wherein the first handle support is a disk having a diameter equal to the common radius of curvature.

5. The gardening tool of claim 1 wherein the lower surface of the base, a lower surface of the scoop and a lower surface of the cutter are aligned and extend parallel to the longitudinal axis of the tool.

6. The gardening tool of claim 1 wherein the base and the scoop are comprised of a single piece of material.

7. The gardening tool of claim 1 wherein the base and cutter are comprised of steel, the cutter has a greater thickness than the base and is welded to the base.

8. The gardening tool of claim 1 wherein the base, scoop and cutter are comprised of stainless steel.

9. The gardening tool of claim 1 wherein first handle support is affixed to the base and a first end of the handle, the first handle support extending from the upper surface of the base to the handle and the tool further includes a second handle support affixed to the base and a second end of the handle, the second handle support extending from the upper surface of the base to the handle.

10. A gardening tool comprising:
  a) a base having a lower surface and an upper surface;
  b) a scoop extending from the base and defining a first end of the tool, the scoop including a curved portion having a peripheral edge for digging and a second portion extending between the curved portion and the base for transporting material;
  c) a cutter extending from the base and defining a second end of the tool, the cutter including a tapered portion having a sharpened peripheral edge for cutting;
  d) a handle affixed to the base and extending in a direction parallel to a longitudinal axis of the tool and being offset in a direction transverse to the longitudinal axis of the tool from the upper surface of the base, an upper surface of the scoop and an upper surface of the cutter; and
  e) a first handle support affixed to the base and the handle and a second handle support affixed to the base and the handle, the first and second handle supports being offset from an extent of the curved portion of the scoop in the direction parallel to the longitudinal axis of the tool and being offset from an extent of the tapered portion of the cutter in the direction parallel to the longitudinal axis of the tool.

11. The garden tool of claim 10 wherein an extent of the handle in the direction parallel to the longitudinal axis of the tool being offset from an extent of the curved portion of the scoop in the direction parallel to the longitudinal axis of the tool and being offset from an extent of the tapered portion of the cutter in the direction parallel to the longitudinal axis of the tool.

12. The gardening tool of claim 10 wherein the base, scoop and cutter are arcuate in direction orthogonal to the longitudinal axis of the tool.

13. The gardening tool of claim 12 wherein the base, scoop and cutter have a common radius of curvature.

14. The gardening tool of claim 13 wherein the first and second handle supports are disks having a diameter equal to the common radius of curvature.

15. The gardening tool of claim 10 wherein the lower surface of the base, a lower surface of the scoop and a lower surface of the cutter are aligned and extend parallel to the longitudinal axis of the tool.

16. The gardening tool of claim 10 wherein the base and the scoop are comprised of a single piece of material.

17. The gardening tool of claim 10 wherein the base and cutter are comprised of steel, the cutter has a greater thickness than the base and is welded to the base.

18. The gardening tool of claim 10 wherein the base, scoop and cutter are comprised of stainless steel.

19. A gardening tool comprising:
  a) a base having a lower surface and an upper surface;
  b) a scoop extending from the base and defining a first end of the tool, the scoop including a curved portion having a peripheral edge for digging and a second portion extending between the curved portion and the base for transporting material;
  c) a cutter extending from the base and defining a second end of the tool, the cutter including a tapered portion having a sharpened peripheral edge for cutting;

d) a handle offset from and extending in a direction parallel to a line of action of the tool that extends between a distal end of the curved peripheral edge of the scoop and a distal end of the sharpened peripheral edge of the cutter, an extent of the handle in the direction parallel to the line of action of the tool being offset from an extent of the curved portion of the scoop in the direction parallel to the line of action of the tool and being offset from an extent of the tapered portion of the cutter in the direction parallel to the line of action of the tool; and e) a first handle support affixed to one of the base, the scoop and the cutter and the handle.

20. The gardening tool of claim 19 wherein the first handle support is affixed to the base and a first end of the handle, the first handle support extending from the upper surface of the base to the handle and further including a second handle support affixed to the base and extending from the upper surface of the base to a second end of the handle.

21. The gardening tool of claim 19 wherein a lower surface of the scoop and a lower surface of the cutter are aligned and extend parallel to a longitudinal axis of the tool.

* * * * *